United States Patent [19]

Almagor et al.

[11] Patent Number: 4,862,427

[45] Date of Patent: Aug. 29, 1989

[54] SONAR SYSTEM WITH AREA MOVING TARGET INDICATOR

[75] Inventors: David Almagor; John M. Peters, both of San Diego, Calif.

[73] Assignee: Ketema, Inc., San Diego, Calif.

[21] Appl. No.: 137,525

[22] Filed: Dec. 22, 1987

[51] Int. Cl.[4] .......................... G01S 15/66; G01S 15/04
[52] U.S. Cl. ...................................... 367/101; 367/100
[58] Field of Search ................................ 367/100–102, 367/93, 94; 342/159–162, 196, 185; 364/561

[56] References Cited

U.S. PATENT DOCUMENTS

| | | | |
|---|---|---|---|
| 4,234,880 | 11/1980 | Klemm | 342/159 |
| 4,318,413 | 3/1982 | Kazuhiro | 128/660.05 |
| 4,339,754 | 7/1982 | Hammers et al. | 342/162 |
| 4,383,258 | 5/1983 | Morin | 342/185 |
| 4,566,011 | 1/1986 | Lewis et al. | 342/196 |
| 4,626,855 | 12/1986 | Rouse | 367/101 |

Primary Examiner—Thomas H. Tarcza
Assistant Examiner—Daniel T. Pihulic
Attorney, Agent, or Firm—Baker, Maxham, Jester & Meador

[57] ABSTRACT

A continuous-transmission frequency-modulated (CTFM) scan converted sonar with improved capability for detecting swimmers, miniature submarines and other small intruders in harbors and inlets, and adjacent offshore structures. The system is microprocessor based and menu driven from an operator interactive touch screen. The system utilizes a fast fourier transform (FFT) based frequency analyzer for range discrimination. An area moving target indicator (AMTI) portion of the system cancels echo returns from stationary objects that otherwise mask the echo return of the moving targets. The AMTI causes the system to survey the search area for a number of consecutive scans and store the data. On successive scans, only target information that differs from the stored target map is displayed, thereby reducing clutter caused by surrounding terrain. The AMTI can activate an audio alarm, transmit a serial data alarm message, start a video recorder and annotate the system display to identify the bearing and range of the moving target that has been detected.

1 Claim, 13 Drawing Sheets

SONAR SYSTEM WITH AREA MOVING TARGET INDICATOR

BACKGROUND OF THE INVENTION

The present invention relates to sonar systems, and more particularly, to a sonar system which has an improved probability of detecting moving targets by cancelling all stationary targets within the search area.

There is a need to assist water-side security of harbors, inlets and offshore structures through detection of underwater intruders. Such intruders are often relatively small in size and include human swimmers, swimmer delivery vehicles, miniature submarines, bottom-crawlers, remotely piloted underwater vehicles and self-propelled mines. A significant problem arises if one attempts to use a conventional sonar system to detect such underwater intruders in harbors and inlets, and adjacent offshore structures. Stationary echo returns in such security sensitive areas often mask the intruders. In other words, the presence of the intruders cannot be reliably detected by a conventional sonar system because the echo returns therefrom are overpowered or dominated by echo returns from stationary submerged objects prevalent in such security sensitive areas. These objects include piers, pilings, buoys, pipelines, submerged portions of surface vessels, etc. Fluctuations in environmental conditions, such as water temperature gradients, further inhibit the ability of conventional sonar systems to detect small moving underwater objects in such security sensitive areas.

SUMMARY OF THE INVENTION

It is therefore the primary object of the present invention to provide an improved water-side security system for harbors, inlets and offshore structures.

It is another object of the present invention to provide a sonar system having an improved capability for detecting small, moving underwater targets.

It is still another object of the present invention to provide a sonar system for detecting underwater intruders that enter harbors, inlets and secure areas surrounding offshore structures by preventing the masking of such intruders by stationary echo returns in such areas.

The present system provides a continuous-transmission frequency-modulated (CTFM) scan converted sonar with improved capability for detecting swimmers, miniature submarines and other small intruders in harbors and inlets, and adjacent offshore structures. The preferred embodiment system is microprocessor based and menu driven from an operator interactive touch screen. It utilizes a fast fourier transform (FFT) based frequency analyzer for range discrimination. An area moving target indicator (AMTI) portion of the system cancels echo returns from stationary objects that otherwise mask the echo returns of the moving targets. The AMTI causes the system to survey the search area for a number of consecutive scans and store the data. On successive scans, only target information that differs from the stored target map is displayed, thereby reducing clutter caused by surrounding terrain. The AMTI can activate an audio alarm, transmit a serial data alarm message, start a video recorder and annotate the system display to identify the bearing and range of the moving target that has been detected.

DESCRIPTION OF THE PREFERRED EMBODIMENT

Figure 1:
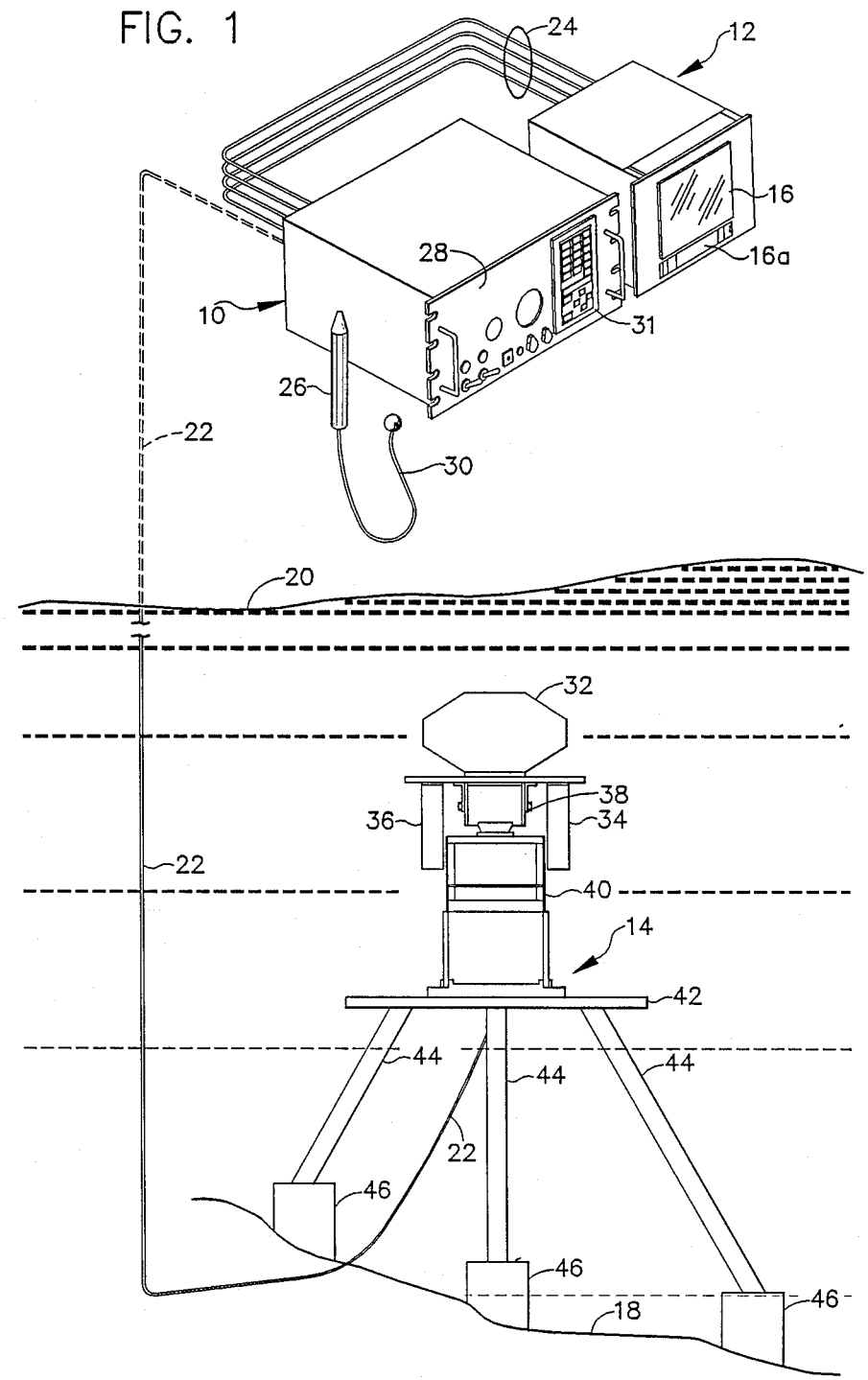
FIG. 1 contains perspective and side elevation views of the basic components of a preferred embodiment of the sonar system of the present invention, including a sonar unit, a display unit, and an underwater unit.

FIG. 1 illustrates the basic components of a preferred embodiment of the sonar system of the present invention. The system is a continuous-transmission frequency-modulated (CTFM) scan converted sonar. The system is microprocessor based and menu driven from an operator interactive touch screen. The system utilizes a fast fourier transform (FFT) based frequency analyzer for range discrimination. The main system components include an above water sonar unit 10, an above water display unit 12, and an underwater unit 14. The display unit has a CRT 16. The underwater unit 14 is rigidly mounted on sea bottom 18 and is connected to the sonar unit 10 above the surface 20 of the water via inboard/outboard interconnect cables 22. The display unit 12 is connected to the sonar unit 10 via cables 24. An optional light pen 26 may be removeably connected to a front panel 28 of the sonar unit 10 via cable 30. An operator can touch the CRT 16 with the point of the light pen 26 at the desired location so that a cursor will appear at that location.

The sonar unit 10 contains the signal and display processors, topside telemetry, speaker, alarm indicator, and all operator controls. Operation of the system is semi-automatic, requiring a minimum of action by the operator. At initial power ON, the system defaults to set all outputs to minimum value plus scan control to STOP. This ensures positive operator control at all times. After placing the system in operation, the operator's primary function is to monitor visual display and audio output. Control or alphanumeric data entry may be accomplished at touchscreen 31 on the front panel 28 which displays different configurations of buttons and controls which are touched to accomplish the indicated functions and commands. These menus and a keypad are illustrated in FIGS. 12 through 16. The touchscreen overlies an electro-luminescent panel that displays one of the four selectable menus or the keypad. The main menu is the system default menu. System control or menu change is accomplished by touching the desired function The sonar and AMTI setup menus of FIGS. 13 and 16, respectively, each have a pair of simulated, elongate vertical slide bar function controls marked GAIN and AUDIO. Touching the GAIN bar on the FIG. 13 menu and sliding the finger up or down changes the sonar gain up or down a corresponding amount. Touching the AUDIO bar on the FIG. 13 menu in a similar fashion changes the front panel speaker volume. Touching the GAIN bar on the FIG. 16 menu and sliding the finger up or down changes the AMTI gain up or down a corresponding amount. Touching the AUDIO bar on the FIG. 16 menu in a similar fashion changes the front panel speaker volume.

A number of other manually actuated controls and accessories are mounted on the front panel 28 of the sonar unit 10 including the following controls and accessories which are illustrated in FIG. 1 but are too small to mark with separate reference numerals in FIG. 1: scan power circuit breaker, sonar power circuit breaker, light pen connector, composite video output jack for connection to a VCR, microphone jack, headset jack, sonar indicator lamp and scan indicator lamp. The microphone input provides a means to narrate the sonar recording by mixing the operator supplied audio with the sonar VCR audio output. A circular audio speaker and audio alarm are also illustrated in FIG. 1 as being mounted on the control panel 28. Hereafter the controls on the control panel, including the touchscreen, are sometimes collectively referred to as controls 28.

Figure 17:
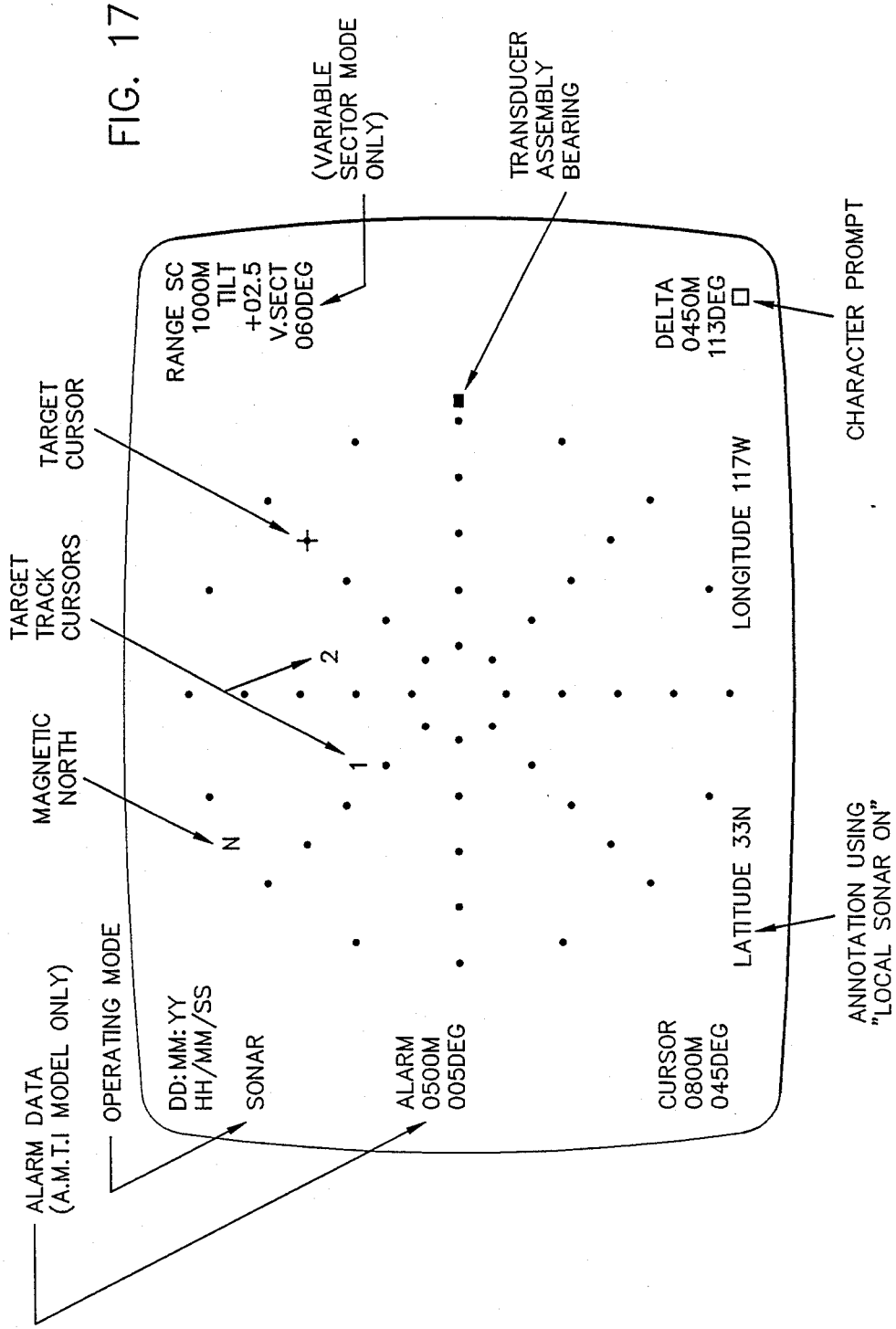
FIG. 17 illustrates a typical sonar display that may appear on the CRT color video monitor of the display unit of the preferred embodiment of the sonar system.

Referring again to FIG. 1, the display unit 12 has a CRT 16 preferably in the form of a color video monitor. The monitor displays target and system status information. A typical sonar display for the video monitor is illustrated in FIG. 17. Both target and operating status information are displayed. Target data is updated on a scan-by-scan basis with the entire presentation held in memory until updated by the next scan. The entire scan area is always viewed at one glance without delay. Significant alphanumeric data is displayed, including range, scale, date, time, tilt angle, and cursor range and bearing. Conventional color video monitor adjustment controls are located behind a removeable panel 16a of the display unit. The operator controls on the display unit 12 affect only that unit, and they have no effect on the sonar unit 10.

The underwater unit includes a transducer assembly, a scan/tilt mechanism and an outboard electronics assembly. Referring still to FIG. 1, the underwater unit 14 has a sonar transducer assembly including a hydrophone receiver 32 and a projector 34. A dummy projector 36 having the same shape and size as the projector is mounted opposite the projector in order to achieve uniform hydrodynamic loading of the scan/tilt mechanism. By way of example, the projector 34 may have a bandwidth of sixty degrees horizontal and six degrees vertical. The hydrophone receiver 32 may have a band width of three degrees horizontal and six degrees vertical. By way of further example, the underwater unit 14 may be configured to operate in one of three separate frequency bands, e.g. 82-97 KHz, 107-122 KHz or 132-147 KHz. Transmit and receive channels can be configured to operate on one of three different frequencies, thereby permitting a network of three spaced apart underwater units to function without mutual interference.

Figure 5:
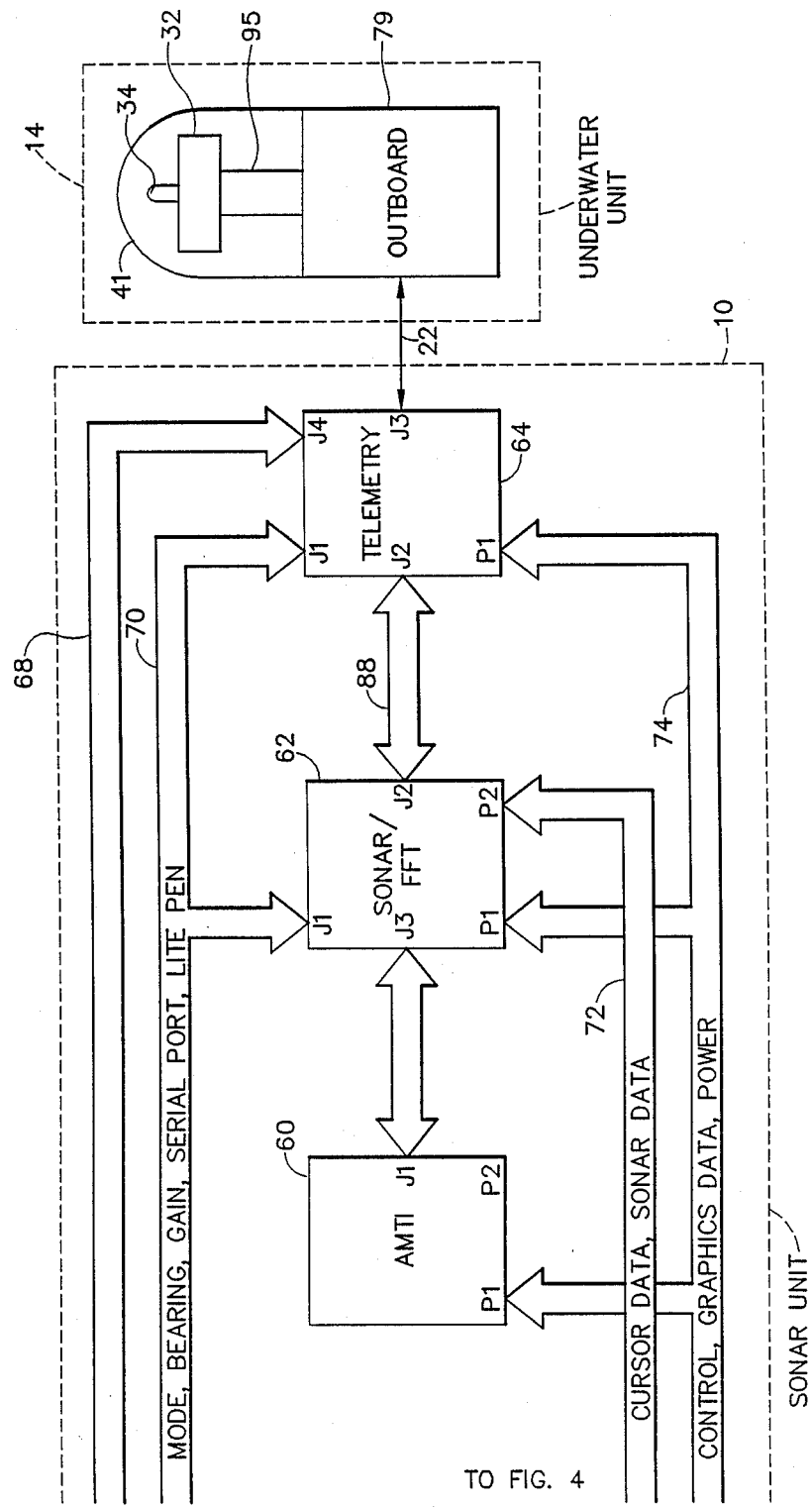

The transducer assembly elements 32, 34 and 36 (FIG. 1) are supported by brackets on top of a tilt mechanism 38 for limited rotation about a horizontal axis, e.g. plus or minus fifteen degrees from horizontal in one-half degree increments. The tilt mechanism is in turn supported on top of a scan mechanism 40 so that the transducer assembly can be rotated 360 degrees about a vertical axis. By way of example, two scan speeds may be selected, twenty-three degrees per second or fifteen and one-half degrees per second. The tilt and scan mechanisms contain two reversible electric motors, a slip-ring assembly, and two shaft position potentiometers. The rotating components are projected against mechanical shear by stall tolerant motors. The tilt and scan mechanisms are oil filled for pressure compensation, via a rubber boot 41 (FIG. 5). The scan mechanism 40 is in turn rigidly supported on top of a tripod including horizontal support platform 42 connected to three diverging legs 44. The lower ends of the legs 44 terminate in footings 46 secured in the sea bottom 18. Preferably the underwater unit 14 may operate at depths of 200 meters with connecting cable 22 being 3000 meters in length.

The projector 34 (FIG. 1) converts the electrical output of a power amplifier in the underwater unit 14 into acoustic energy and transmits it into the water. The beam pattern of the projector is sufficiently wide to have the center of the beam pattern of the hydrophone 32 sweep across the bearing of the target at the time that the return signals arrive from maximum range.

The hydrophone 32 (FIG. 1) converts the acoustic energy received from the echo producing objects into electrical signals. These electrical signals are sent to the sonar receiver in the outboard electronics assembly of the underwater unit for amplification and processing.

The preferred embodiment of our system is capable of detecting echo-producing objects in a 360 degree scan area at ranges from ten to one thousand meters. Targets in a narrow twenty degree wedge, centered at 180 degrees relative, are not displayed. Five range scales are available to provide the most efficient use of the display area and to allow closer examination of targets of interest. Selectable scan modes allow a plan position indicator (PPI) display or a display of sectors of varying width. A transducer tilt function is provided to optimize system range capability in a shallow water environment. In deep water, the tilt function provides some degree of vertical resolution for targets. Target returns are processed to provide both video and audio presentations. The audio bandwidth of the system may be 300-3000 Hz.

Figure 2:
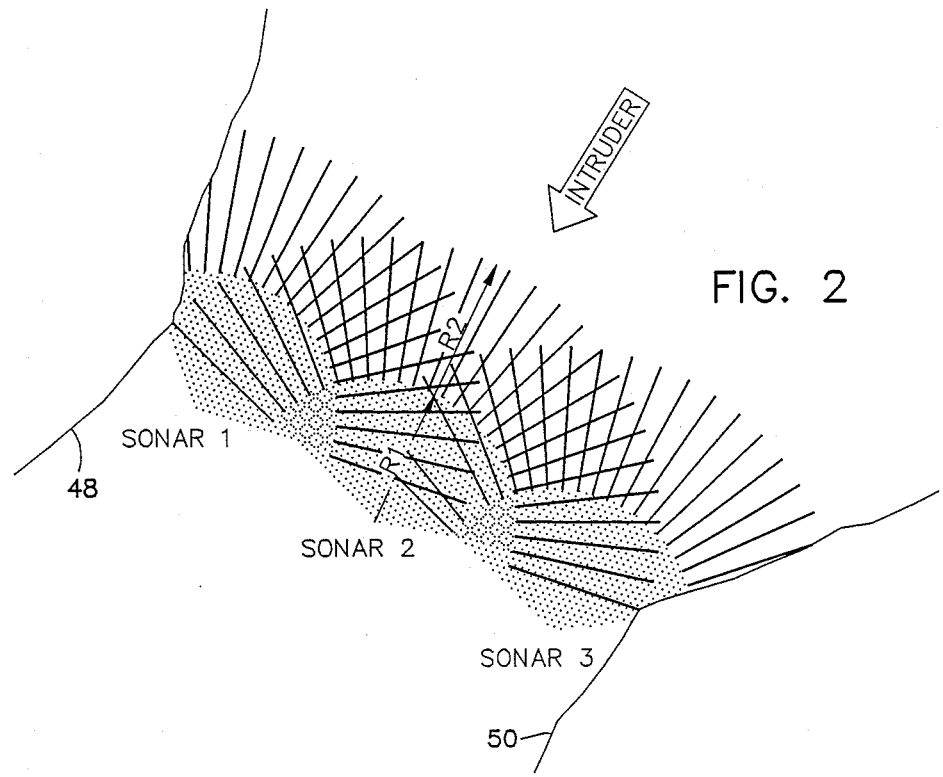
FIG. 2 is a diagrammatic plan view illustrating the installation of three underwater units in an inlet. The stippled areas indicate the detection range for swimmers while the lined areas indicate the detection range for targets such as miniature submarines.

FIG. 2 illustrates the installation of three underwater units in an inlet defined by shore lines 48 and 50. The three underwater units are spaced apart across the inlet and are labeled SONAR 1, SONAR 2 and SONAR 3. The stippled sector areas indicate the detection range R1 for swimmers. The apexes of these stippled areas indicate the approximate locations of the individual underwater units which operate in three separate sonar frequency bands to avoid interference with each other. The lined areas indicate the detection range R2 for larger, more distant moving targets such as miniature submarines. FIG. 2 illustrates a single intruder in the form of a labeled arrow about to enter the larger detection range. The location and spacing of the underwater units for optimum coverage of the inlet can be determined by evaluation of bottom features, water depth, and the target nature of the anticipated intruder. By way of example, the inlet covered by the three underwater units may measure approximately 1000 meters in width, R1 may measure approximately 250 meters and R2 may measure approximately 500 meters. The more complex diamond pattern portions of the stippling indicate search detector overlap.

Figure 3:
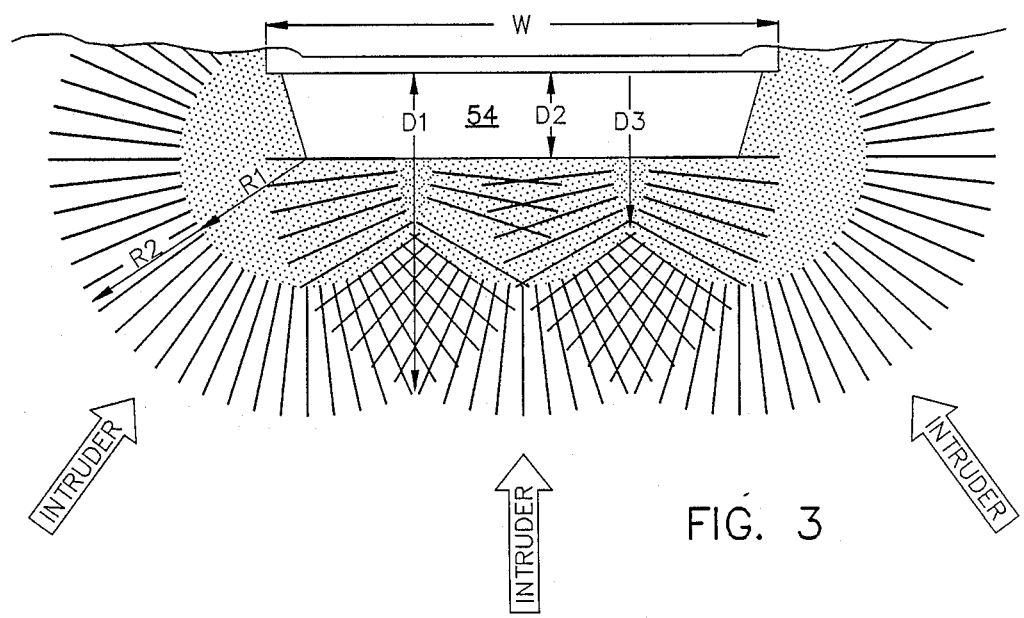
FIG. 3 is a diagrammatic plan view illustrating the installation of three underwater units for coverage along a dock. The stippled areas indicate the detection range for swimmers while the lined areas indicate the detection range for targets such as miniature submarines.

FIG. 3 illustrates the installation of three underwater units for coverage along a dock 52. By way of example, the dock may have a width W of 1000 meters. The stippled areas indicate the detection range R1 for swimmers while the lined areas indicate the detection range R2 for larger, more distant moving targets such as miniature submarines. The underwater units are spaced apart to allow reasonable overlap for detection of swimmers. To minimize disturbance from ships in the immediate dock area and extend the detection distance, the three underwater units are installed a distance D2 such as 150 meters outside the dock 52. Thus, where R1 is 250 meters and R2 is 500 meters, swimmers may be detected a distance D3 or 300 meters from the dock and miniature submarines may be detected a distance D1 or 600 meters from the dock. For optimum coverage, location and spacing of the underwater units can be determined by evaluation of bottom features, water depth, and the nature of the anticipated intruder. FIG. 3 illustrates three intruders in the form of labeled arrows about to enter the larger detection range R2 from three different directions. An unmonitored area 54 immediately adjacent the dock 52 cannot be entered without passing through the ranges under surveillance by the three underwater units.

Figure 4:
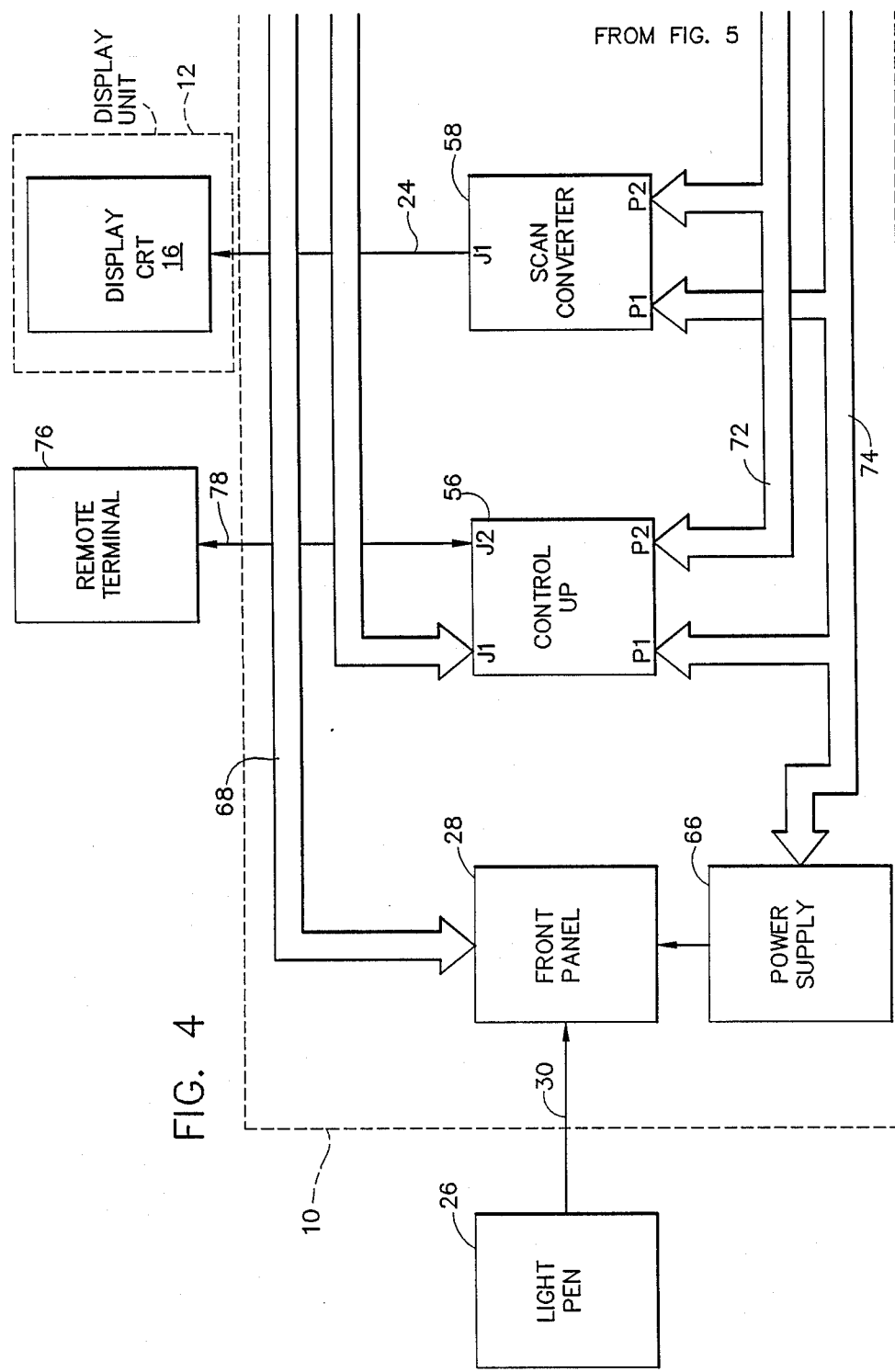
FIGS. 4 and 5, taken together, are an overall block diagram of the preferred embodiment of the sonar system of the present invention whose physical components are illustrated in FIG. 1.

FIGS. 4 and 5, taken together, illustrate an overall block diagram of the preferred embodiment of the sonar system of the present invention. The four busses that terminate on the right hand side of FIG. 4 connect to the correspondingly positioned ones of the four busses on the left hand side of FIG. 5. The basic functional blocks of the sonar unit 10 include a control up block 56, scan converter block 58, an area moving target indicator (AMTI) block 60, a sonar/fast fourier transform (FFT) block 62, and a telemetry block 64. The sonar unit also includes a power supply 66 and the front panel controls 28 which communicate with the telemetry block 64 via bus 68. Mode, bearing, gain, serial port and light pen data are block 60 and the telemetry block 64 via bus 70. Cursor and sonar data are communicated between the control up block 56, the scan converter block 58 and the sonar/FFT block 62 via bus 72. Control signals, graphics data and power are transmitted between the power supply 66, the control up block 56, the scan converter block 58, the AMTI block 60, the sonar/FFT block 62 and the telemetry block 64 via bus 74. The display unit 12 is connected to the scan converter block 58 of the sonar unit 10 via cables 24. An optional remote terminal 76 may be connected to the control up unit 56 of the sonar unit 10 via cable 78. Bi-directional serial port communication may be provided via an RS-232C serial port connector located on a rear panel of the sonar unit 10.

Figure 6:
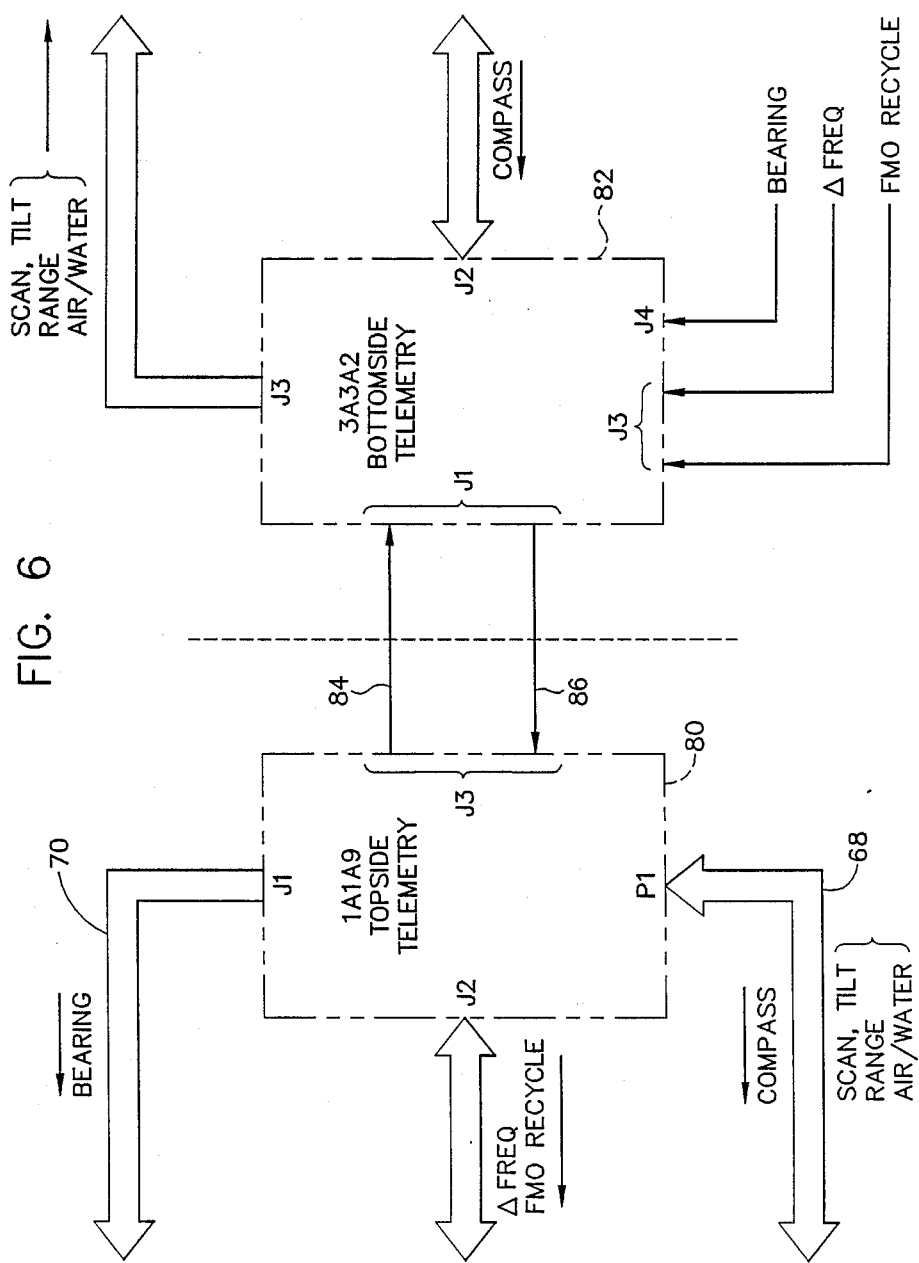
FIG. 6 is a block diagram illustrating further details of the telemetry portion of the system of FIGS. 4 and 5.

Details of the telemetry block 64 and outboard electronics 79 (FIG. 5) of the system are illustrated in FIG. 6. The sonar unit 10 and the underwater unit 14 exchange signals via their respective telemetry interface boards 80 and 82. Each of these boards transmits serial data via individual twisted shielded pairs 84 and 86 within the cable 22 (FIG. 1) connecting the sonar and underwater units. The top side telemetry board 80 (FIG. 6) receives scan, tilt, range select and air/water commands via bus 68. These commands are formatted and sent to the underwater unit. The bottom side telemetry board 82 receives this down-link data and passes it to a sonar transceiver board for decoding and implementation. The bottom side telemetry board also receives a digital heading from a compass 87 (FIG. 7), analog delta frequency and frequency modulated oscillator (FMO) cycle signals from the sonar transceiver board, and analog bearing information from the scan/tilt mechanisms. This information is formatted and sent to the sonar unit. The top side telemetry board 80 receives this up-link data, decodes it, and passes it to the appropriate section of the sonar unit via the appropriate busses, including bus 88 (FIG. 5) connecting the sonar/FFT block 62 and the telemetry block 64.

Figure 7:
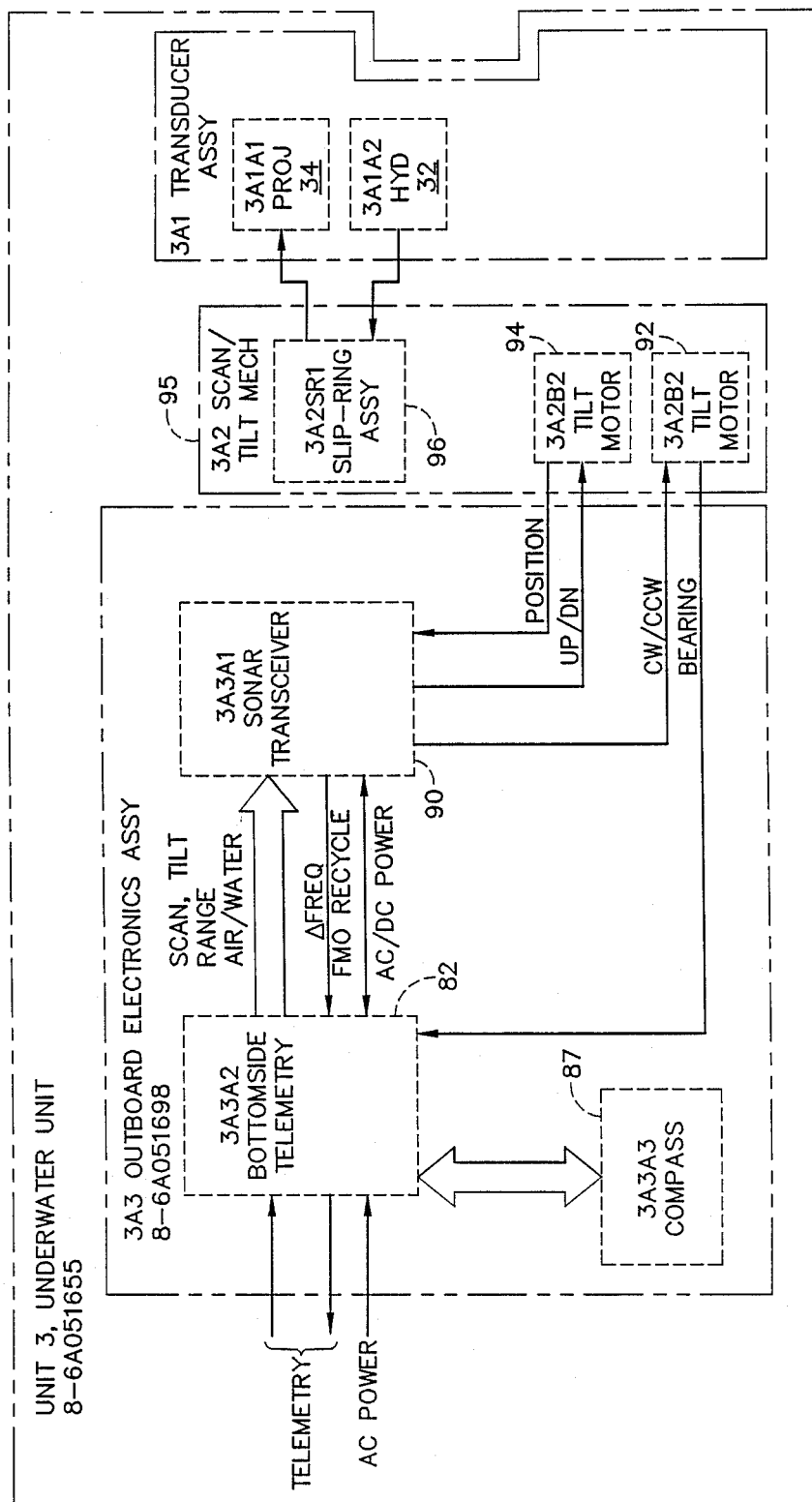
FIG. 7 is a block diagram illustrating further details of the underwater unit of the system of FIGS. 4 and 5.

Details of the underwater unit 14 are illustrated in the block diagram of FIG. 7. It includes the bottom side telemetry board 82, a sonar transceiver board 90, and the compass 87. The transceiver board uses primary AC power to drive scan and tilt motors 92 and 94. The reference numeral 95 (FIGS. 5 and 7) refers collectively to the tilt mechanism 38 and the scan mechanism 40. The scan and tilt mechanism 95 (FIG. 5) contains two position indicating potentiometers, one for scan and one for tilt. The scan position output, called BEARING, is sent directly to the telemetry board for transmission to topside. The tilt position output is sent to the transceiver board for tilt control. The projector 34 and the hydrophone 32 are electrically connected to the sonar transceiver board 90 via slip-ring assembly 96.

Figure 8:
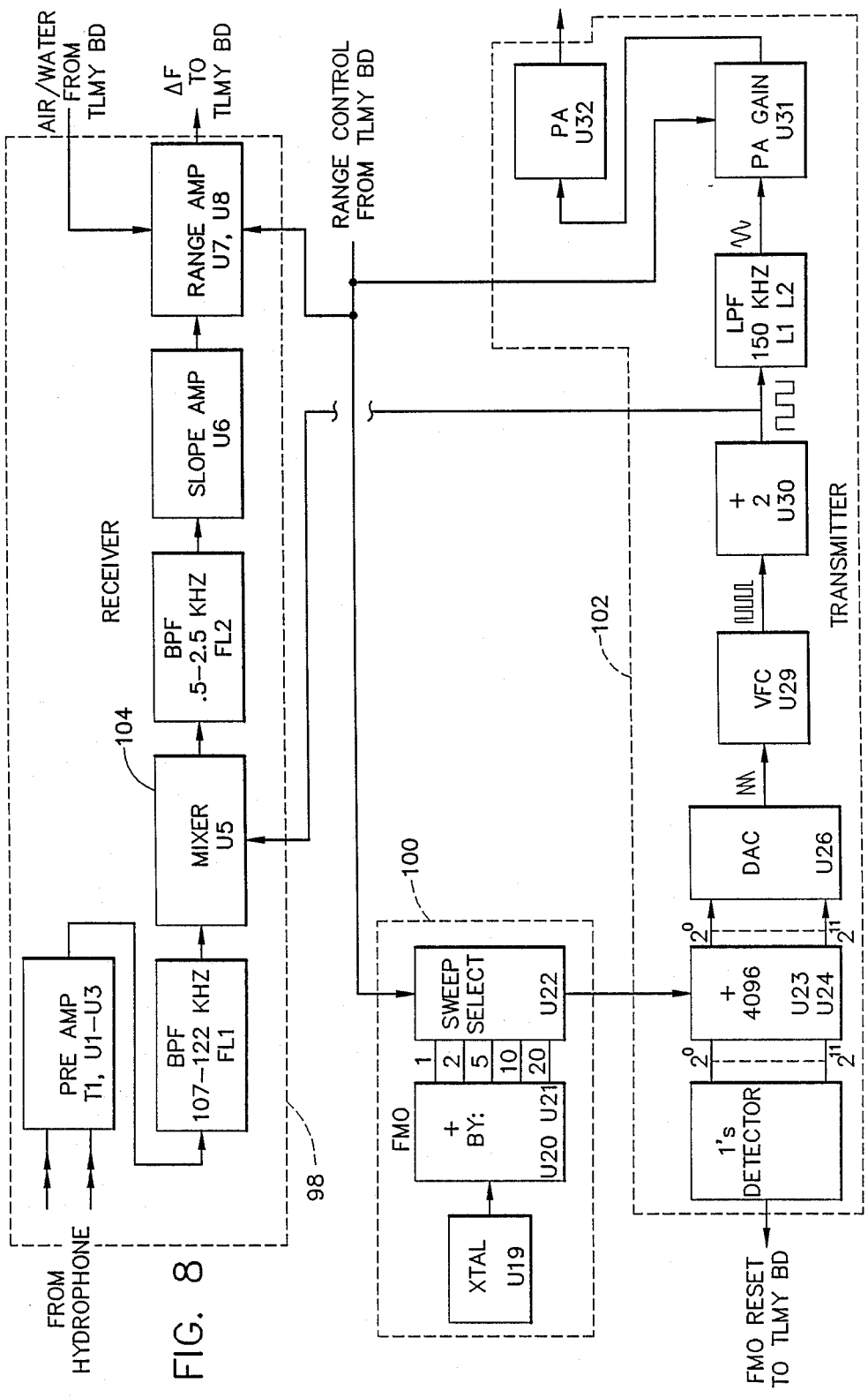
FIG. 8 is a block diagram illustrating further details of the sonar transceiver of the system of FIGS. 4 and 5.

Details of the sonar transceiver board 90 (FIG. 7) are illustrated in FIG. 8. It consists of three main sections: a receiver 98, a frequency modulated oscillator (FMO) 100 and a transmitter 102. The receiver amplifies the output signal from the hydrophone 32 and mixes it with the FMO signal to produce a difference frequency delta F. The range control input adjusts the receiver's gain as different range scales are selected. The air/water control signal, when air is selected, conditions the receiver for maximum gain for maintenance test and echo ranging in air. Water is the normal operating mode. The FMO 100 produces the band of frequencies used by the transmitter 102 and the mixer circuit 104 of the receiver 98. The rate of frequency change is established by the range control input signal. The transmitter 102 amplifies the FMO signal and drive's the sonar projector 34. The range control input signal is also used to set the system output power based on the selected range scale.

Figure 9:
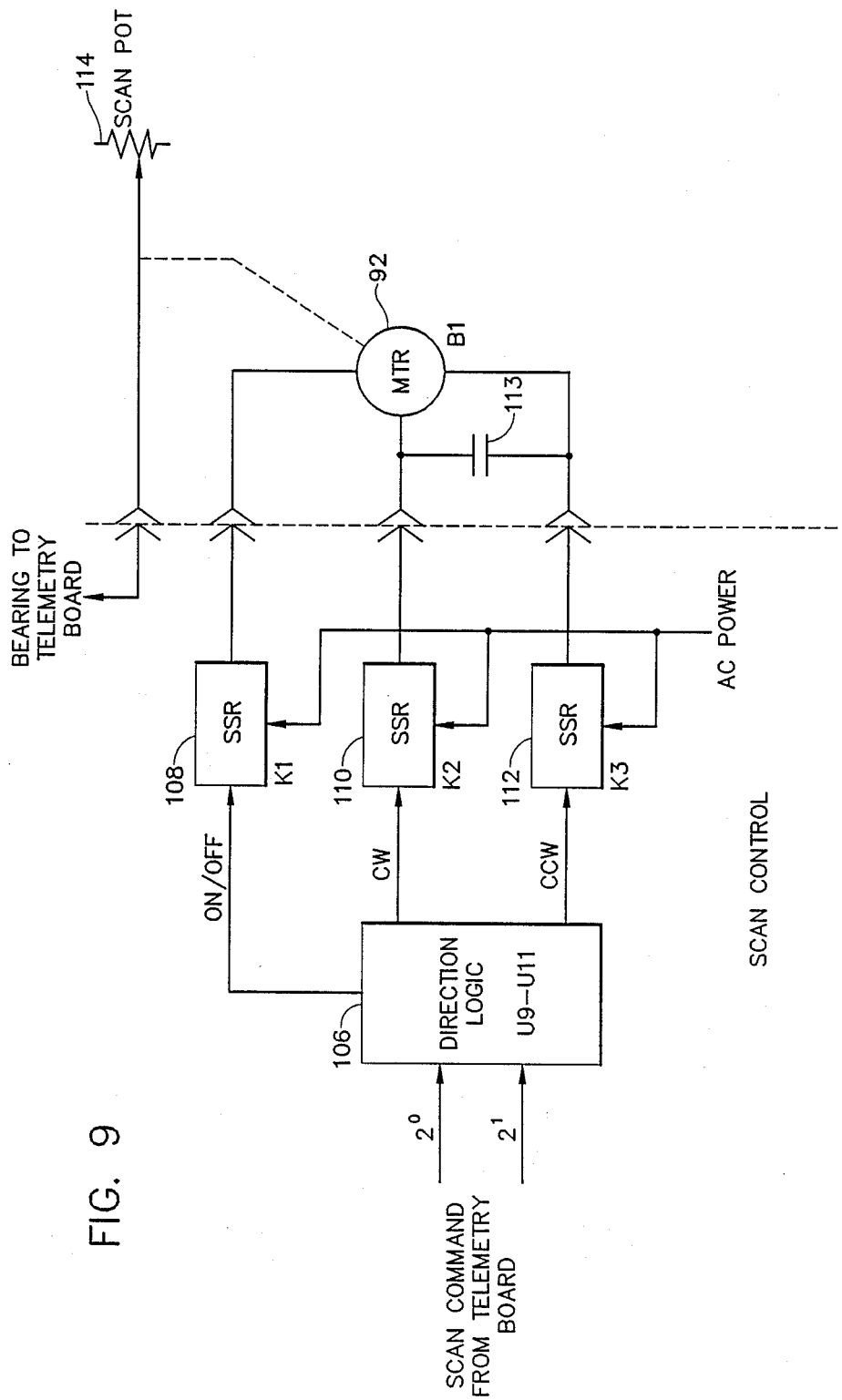
FIGS. 9 and 10 are block diagrams illustrating further details of the scan and tilt control portions of the system of FIGS. 4 and 5.

Referring to FIG. 9, the scan commands, CW, CCW or STOP from the telemetry board 82 (FIG. 7) are received by direction logic circuits 106 (FIG. 9). These circuits control solid state relays 108, 110 and 112 which apply primary power to the scan motor 92 and its phase shaft capacitor 113. The output signal from the scan potentiometer 114 represents the shaft angular position, or bearing, of the attached sonar transducer assembly.

Figure 10:
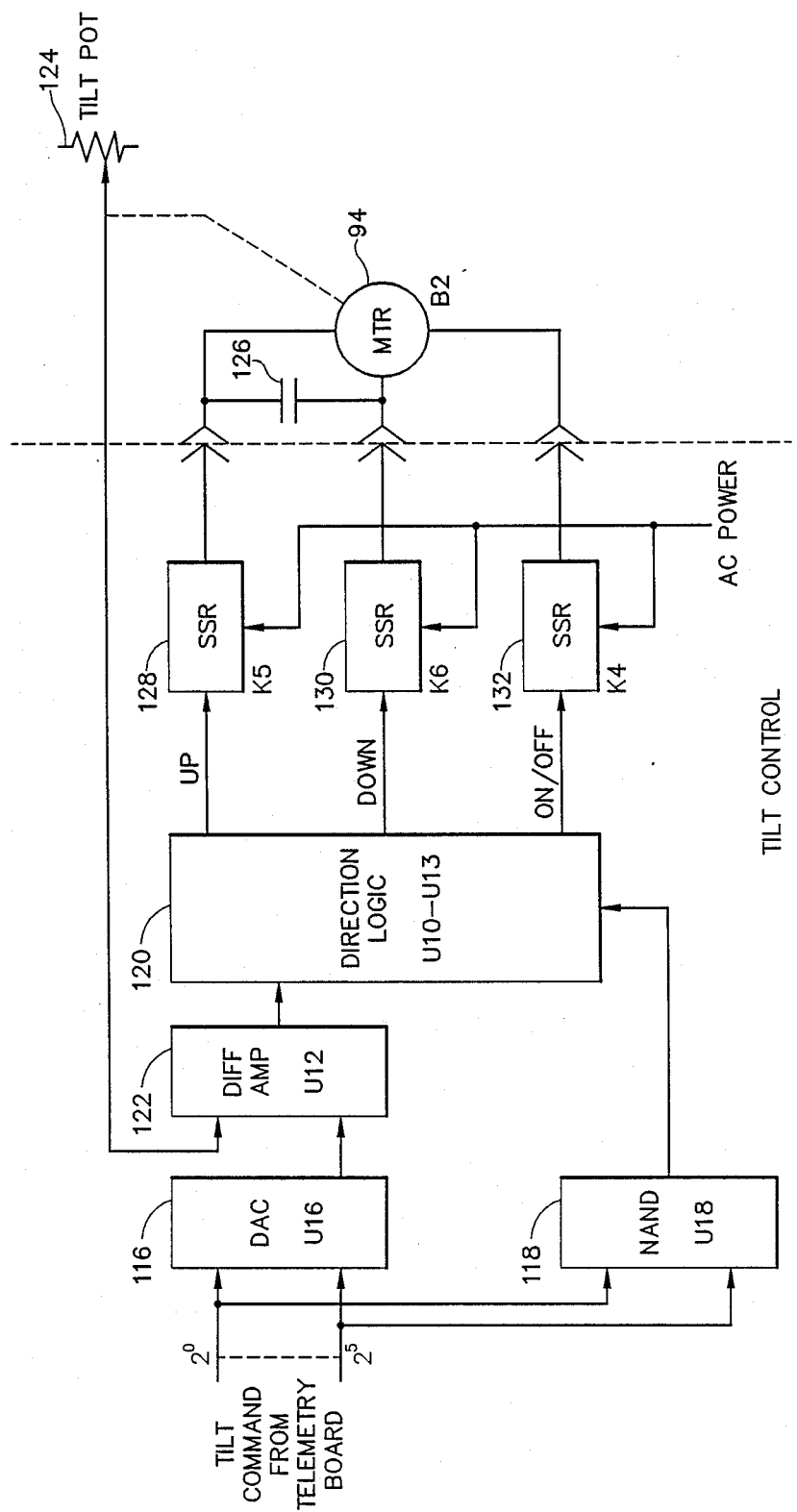

Referring to FIG. 10, the tilt commands UP or DOWN from the sonar transceiver board 90 (FIG. 7) are received by a digital-to-analog converter (DAC) 116 (FIG. 10) and a NAND gate 118. This gate operates to provide enable, or on/off, signals to direction logic circuits 120. The DAC 116 produces an output voltage proportional to the selected direction and degree of tilt. A differential amplifier 122 senses the difference between the DAC output and the actual position of a tilt potentiometer 124. This difference signal is sent to the direction logic circuits which control the tilt motor 94 and its phase shaft capacitor 126 through solid state relays 128, 130 and 132.

The scan conversion block 58 (FIG. 4) of the system is a microprocessor controlled video processor which digitizes and enhances raw data received for display on the color video monitor 16. The digitized data is amplitude weighted, and then quantitized into one of sixteen levels corresponding to its amplitude in one of four operator selectable quantization tables. Selection of three of the tables allows the operator to skew the digitized data in a manner which may enhance small signals, while degrading larger ones, or effectively eliminating smaller targets altogether. A fourth table processes raw data in a linear manner. This quantitized data is then presented in one of four operator selected color maps. Each of the four maps provides a mix of colors representing sixteen levels of digitization. The data is displayed as distinct color or hue changes within a selected map, programmed to go from cool to hot as target strength increases.

Scan conversion of received sonar data provides the operator greater flexibility in detecting and classifying target information than is possible with a conventional monochromatic PPI display. The standard scan color video format, for display purposes, allows the use of color to emphasize target level differences, i.e. the eye perceives a change in color more readily than a change in brightness. In addition, the display is memory-refreshed to avoid the problem of phosphor image fade inherent in older display systems. The scan conversion process also provides a convenient means of recording sonar information for post analysis or training purposes, through a VCR compatible composite video output.

The sonar/FFT block 62 (FIG. 5) of the system incorporates a digital spectrum analyzer and micro-controller to enhance resolution of displayed data. The analyzer employs a conventional fast fourier transform (FFT) program to perform the spectrum analysis for range discrimination. The sonar/FFT block 62 receives delta F and bearing signals from the telemetry block 64 and all control commands plus gain information from the processor in the control block 56.

Figure 11:
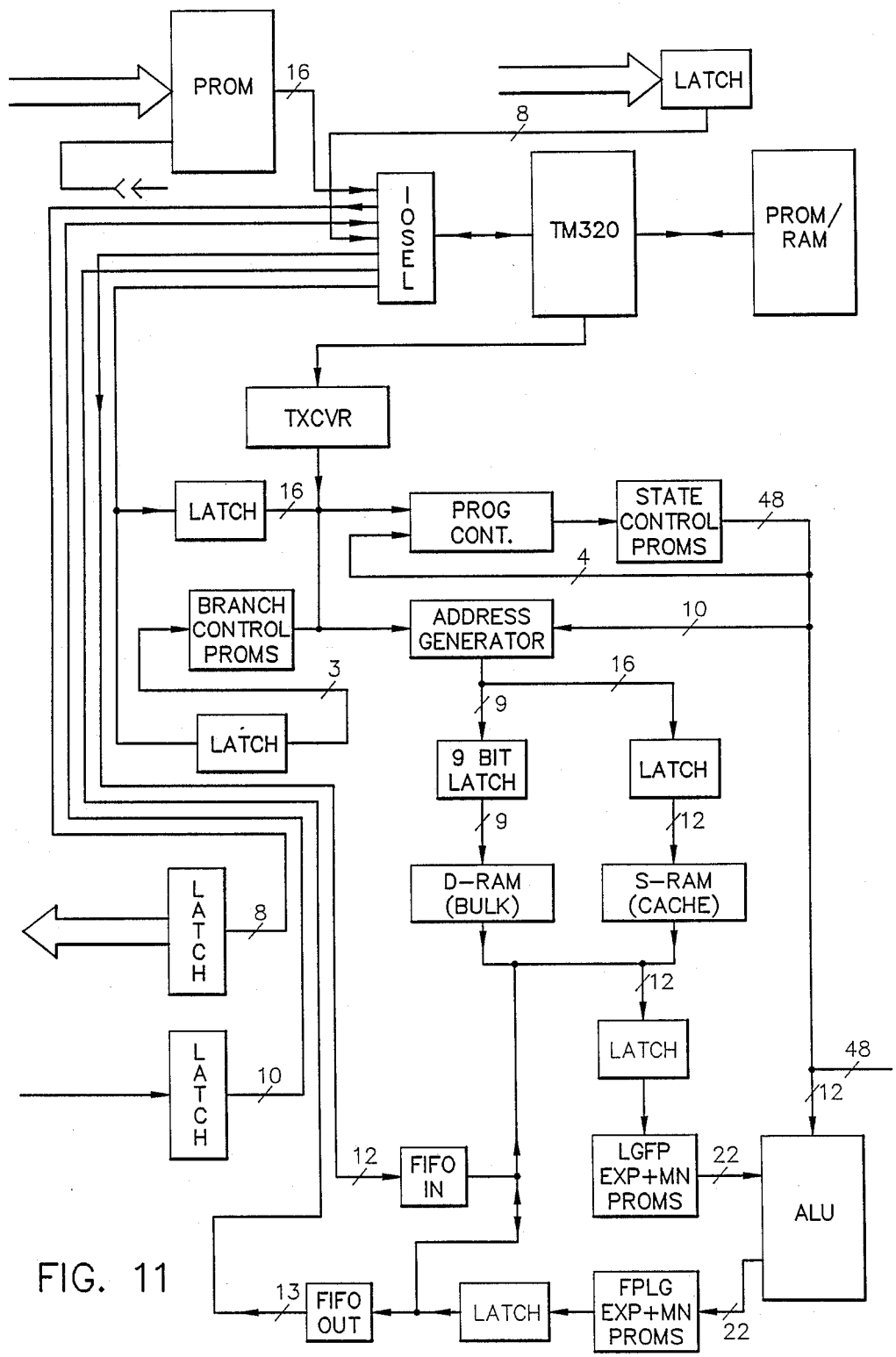
FIG. 11 is a block diagram illustrating further details of the area moving target indicator (AMTI) portion of the system of FIGS. 4 and 5.
Figure 12:
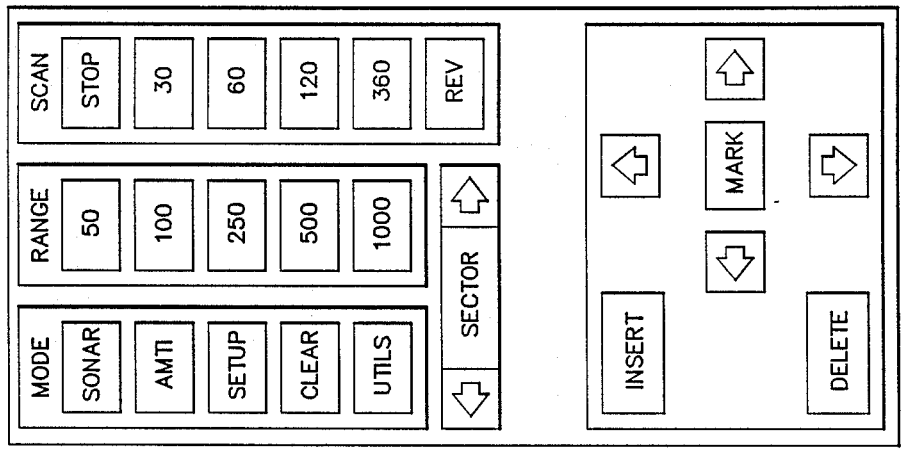
FIG. 12 illustrates a main menu that is displayed by command on the touchscreen of the sonar unit.
Figure 13:
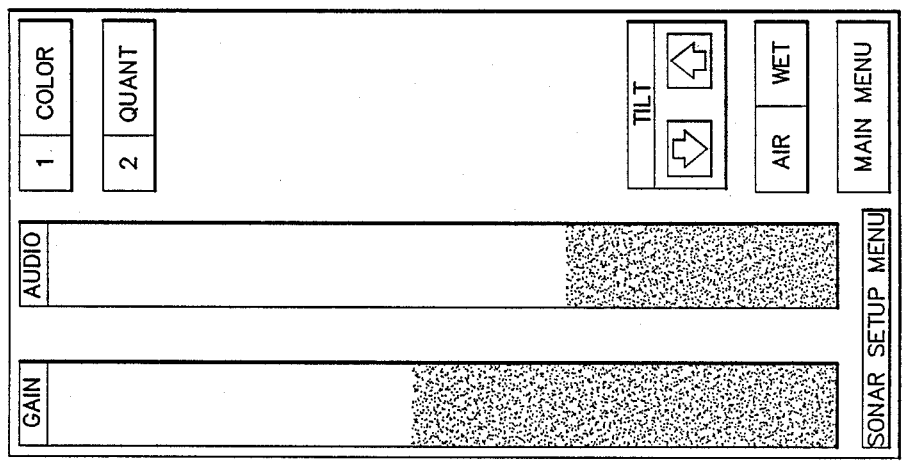
FIG. 13 illustrates a sonar setup menu that is displayed by command on the touchscreen of the sonar unit.
Figure 14:
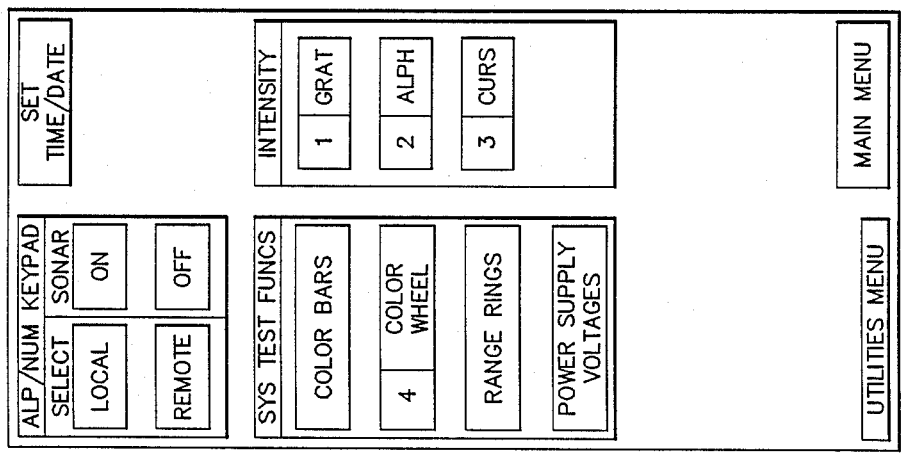
FIG. 14 illustrates a utilities menu that is displayed by command on the touchscreen of the sonar unit.
Figure 15:
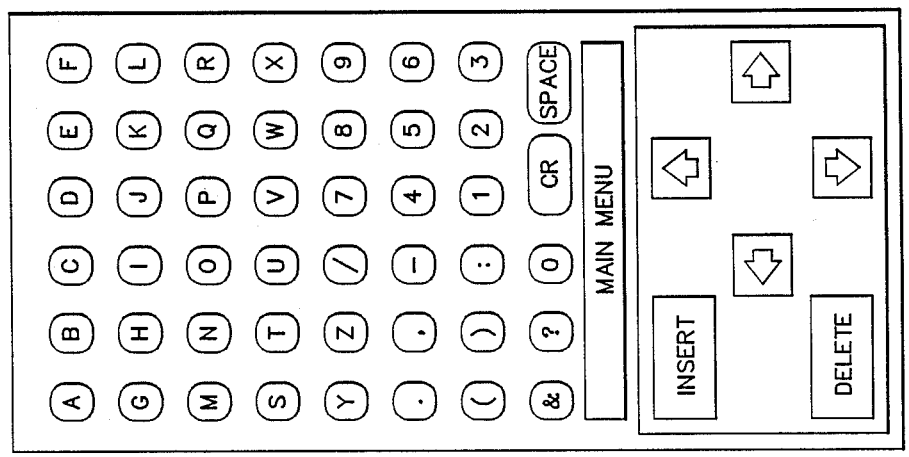
FIG. 15 illustrates an alphanumeric keypad that is displayed by command on the touchscreen of the sonar unit.
Figure 16:
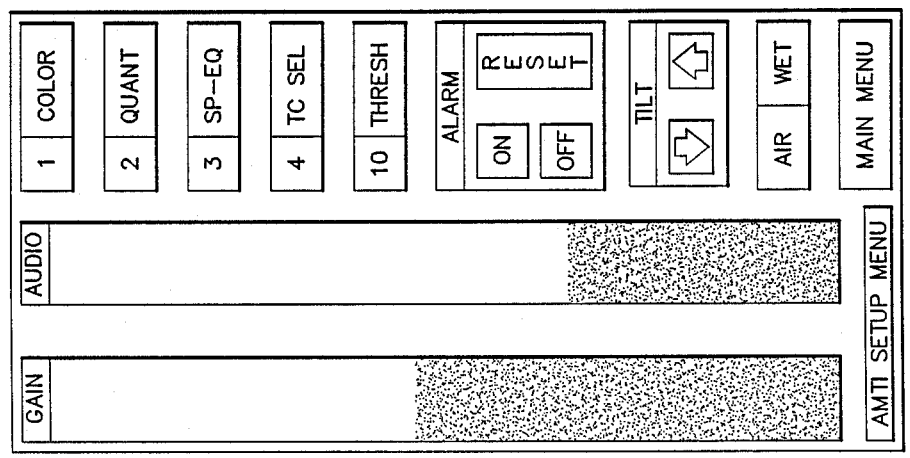
FIG. 16 illustrates an AMTI set up menu that is displayed by command on the touchscreen of the sonar unit.

The Area Moving Target Indicator (AMTI) block 62 (FIG. 5) significantly enhances the capability of the system to detect the presence of acoustic reflectors (targets) which exhibit motion relative to the stationarily mounted underwater unit 14. FIG. 11 is a block diagram of a preferred implementation of the AMTI. Once a possible moving target has been detected, the central processor is signaled. The central processor in turn alerts the operator to a possible detection via a message on the display 16 and via the audio alarm.

The method employed by the AMTI is to estimate and store a long term reference of the acoustic returns in the field of view of the underwater transducer assembly. This reference memory is then compared with the latest returns in the field of view to detect the presence of a possible non-stationary acoustic reflector. Statistical variability of the acoustic returns renders it impossible to detect with complete reliability the presence of these moving targets. At high moving target to background acoustic return ratios, complete reliability can be asymptotically approached. A T-statistical detection hypothesis test is formed for each individual resolution element utilizing both the corresponding mean and variance of the acoustic returns. This hypothesis test is used rather than others as it performs more reliably as the target to background return ratio decreases.

Initially, the AMTI determines whether the FFT analyzer is processing uncorrupted receiver data. Receiver data can be corrupted by the FMO recycle and the resultant collapse of the acoustic field. If the data is not corrupted, then the FFT data received is normalized prior to processing to achieve uniformity in target return strength. The most notable correction is to the difference in absorption of acoustic energy from the lowest to the highest frequency that the FMO transmits.

The data block processing inherent with the FFT algorithm inherently parses the system's field of view into a dual dimensional grid of 128 range by 512 bearing elements. The mean (first moment) and the second moment for each of these individual resolution elements is estimated by an exponential averager algorithm. This algorithm is suitably described by the following difference equation:

(Mean Update)

$$\text{Mean}(i) = \text{Mean}(i-1) - (1/N) * \text{Mean}(i-1) + (1/N) * \text{Raw}(i)$$

(Second Moment Update)

$$Rw2(i) = \text{Raw}(i) * \text{Raw}(i)$$

$$\text{Mom2}(i) = \text{Mom2}(i-1) - (1/N) * \text{Mom2}(i-1) + (1/N) * Rw2(i)$$

where Raw(i) is the FFT filter magnitude for the ith illumination of the particular resolution element being processed, and the resultant mean and second moment estimates for the resolution element at the ith iteration are Mean(i) and Mom2(i). The mean and variance estimates are updated for every illumination to allow quick adaptation to changing environmental conditions such as sea state and sound velocity profiles. The N parameter determines the rate of adaptation of the estimators. A step change to the value of the moments are adapted to within 1/e of their value in N iterations of the algorithm. (e is the Napierian constant 2.71 . . . )

Several (6) T-statistical hypotheses tests are performed for each of the resolution cells. The tests are performed by integrating over several resolution cells grouped as to bearing and range. The tests are oriented for the system as for one range cell by four or five consecutive bearing cells and for two consecutive range cells by four or five consecutive bearing cells. The purpose of the various area averages is to match the hypotheses tests to the range and bearing samples. (i.e. centered in range or bearing cell as opposed to midway between the resolution elements.) The maximum value of the 6 hypotheses tests is selected as hopefully that is the one which corresponds most closely to the target's actual range and bearing orientation.

The T-statistic is defined as:

$$\text{T-stat} = (X - \text{mean})/\text{Var}$$

The various T-statistics which are calculated for each of the resolution elements, their numerators and denominators are calculated separately. The formula for the numerator and denominator are:

$$NM = \sum_{i=1}^{N} \sum_{j=1}^{M} [RAW(i,j) - \text{Mean}(i,j)]$$

$$Den = \sqrt{\sum_{i=1}^{N} \sum_{j=1}^{M} [Mom2(i,j) - \text{Mean}(i,j) * \text{Mean}(i,j)]}$$

A unique correction term is added to the denominator for each of the 6 T-statistics to compensate for the missing co-variance terms.

Integration over 2 to 4 illuminations of the resolution cells is performed to further enhance the reliability of the detection hypothesis. As the target is moving during the time between illuminations the integration is performed over a group of resolution elements large enough such that the target resides within the group over the 4 illuminations.

The actual implementation is to select the maximum T-statistic for six contiguous range samples. The groups of resolution elements overlap each other by 3 range elements. (i.e. peak select over 6 and overlap by 3). The overlap of the groups in bearing is a result of the T-statistics being calculated over several (4 or 5) contiguous bearing elements. These resultant group samples are then summed with the previous illuminations group samples up to the present illumination and 3 previous illuminations.

The AMTI operates as a constant false alarm rate (CFAR) detector, with one of sixteen selectable levels independent of environmental conditions. Each of these selectable levels corresponds to a set of four thresholds, one for each of the levels of integration. (1 to 4 illuminations) These thresholds for the 4 integrations are determined such that exceeding the respective threshold corresponds to the same level of reliability of a detection. (i.e. same false alarm rate for each level of integration)

For each of the levels of integration, the threshold is compared with the accumulated sum over the respective illuminations. If a threshold crossing has been detected then the operator is alerted to an alarm. The sixteen selectable threshold levels have been determined such that the AMTI can be operated over a range of false alarm levels. The operator can select an alarm rate such that it is high enough not to unduly desensitize the receiver detector and low enough such that the operator is not overtaxed in discriminating the remaining false targets from the actual moving targets.

Having described a preferred embodiment of our sonar system in detail, it should be apparent that modifications and adaptations thereof will readily occur to those persons of ordinary skill in the art. Therefore, the protection afforded our invention should only be limited in accordance with the scope of the following claims.

We claim:

1. A sonar system, comprising:
    means for generating a frequency modulated sonar signal in a predetermined sonar frequency band for transmission through a body of water;
    projector means for receiving the sonar signal and continuously transmitting acoustic energy through the body of water representative of the sonar signal;
    hydrophone means for receiving portions of the acoustic energy reflected by a plurality of underwater objects in a predetermined beam pattern and generating output signals representative thereof;
    telemetry means for receiving the output signals from a plurality of successive scans of the hydrophone means and generating frequency variance and bearing signals for each scan;
    FFT means for parsing the frequency variance and bearing signals for each scan into a grid of range by bearing resolution elements; and
    AMTI means for calculating a T statistic value for each resolution element over a predetermined number of contiguous range and bearing resolution elements according to the formula:
    $$T = (X - m)/\text{sigma}$$
    where:
    X is the value of the incoming signal,
    m is the time updated means, and sigma is the standard deviation defined as the square root of the time updated variance,
    and for determining if the T statistic exceeds a predetermined threshold value,
    whereby a moving one of the underwater objects will be detected.

* * * * *

UNITED STATES PATENT AND TRADEMARK OFFICE
CERTIFICATE OF CORRECTION

PATENT NO. : 4,862,427

DATED : August 29, 1989

INVENTOR(S) : Almagor et al.

It is certified that error appears in the above-identified patent and that said Letters Patent is hereby corrected as shown below:

In Claim 1, column 10, line 48, delete "means" and substitute therefor --mean--.

Signed and Sealed this

Thirty-first Day of July, 1990

Attest:

HARRY F. MANBECK, JR.

*Attesting Officer*　　　　*Commissioner of Patents and Trademarks*